(12) United States Patent
Busson et al.

(10) Patent No.: US 10,858,941 B2
(45) Date of Patent: Dec. 8, 2020

(54) SHUTTER FOR TURBINE MACHINE HAVING AN ABSENT RECTIFIER BLADE

(71) Applicant: SAFRAN AIRCRAFT ENGINES, Paris (FR)

(72) Inventors: Thomas Marouane Busson, Moissy-Cramayel (FR); Patrick Jean-Louis Reghezza, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 66 days.

(21) Appl. No.: 16/414,976

(22) Filed: May 17, 2019

(65) Prior Publication Data

US 2019/0360339 A1 Nov. 28, 2019

(30) Foreign Application Priority Data

May 23, 2018 (FR) ...................................... 18 54300

(51) Int. Cl.
*F01D 5/00* (2006.01)
*F01D 5/30* (2006.01)
*F16J 15/06* (2006.01)

(52) U.S. Cl.
CPC ........... *F01D 5/005* (2013.01); *F01D 5/3023* (2013.01); *F16J 15/062* (2013.01); *F05D 2220/32* (2013.01); *F05D 2240/24* (2013.01); *F05D 2240/55* (2013.01)

(58) Field of Classification Search
CPC ...... F01D 5/005; F01D 5/3023; F01D 11/005; F01D 9/041; F01D 9/042; F04D 29/542; F16J 15/062; F05D 2220/32; F05D 2220/36; F05D 2240/24; F05D 2220/55; F05D 2260/36

See application file for complete search history.

(56) References Cited

U.S. PATENT DOCUMENTS

| | | | | |
|---|---|---|---|---|
| 3,721,506 A * | 3/1973 | Anderson | ................. | F01D 5/32 416/215 |
| 4,702,673 A * | 10/1987 | Hansen | ................. | F01D 5/3046 416/215 |
| 6,619,917 B2 * | 9/2003 | Glover | ................. | F04D 29/542 415/209.3 |
| 7,413,400 B2 * | 8/2008 | Barnett | ................. | F01D 9/042 415/119 |
| 7,614,848 B2 * | 11/2009 | Bogue | ................. | B23P 6/005 415/191 |

(Continued)

FOREIGN PATENT DOCUMENTS

| GB | 2420162 A | 5/2006 |
| WO | 2012153037 A1 | 11/2012 |

OTHER PUBLICATIONS

Search Report issued in French Patent Application No. 18 54300 dated Feb. 13, 2019.

*Primary Examiner* — Igor Kershteyn
(74) *Attorney, Agent, or Firm* — Pearne & Gordon LLP

(57) ABSTRACT

A shutter is provided for repairing a turbine engine having a damaged or absent fixed rectifier blade (38, 39), this damaged or absent fixed blade (38, 39) leaving free an opening (34) of a ferrule (31) intended to receive an end of this fixed blade (38, 39). The shutter (48) arranged to close the free opening (34) by being rigidly attached to this free opening (34).

9 Claims, 3 Drawing Sheets

(56) References Cited

U.S. PATENT DOCUMENTS

| | | | |
|---|---|---|---|
| 8,894,372 B2 * | 11/2014 | Willett, Jr. | F01D 5/32 416/220 R |
| 9,512,732 B2 * | 12/2016 | Potter | F01D 11/008 |
| 2015/0101350 A1 * | 4/2015 | Healy | F01D 5/32 60/805 |
| 2015/0101351 A1 * | 4/2015 | Healy | F01D 5/32 60/805 |

* cited by examiner

SHUTTER FOR TURBINE MACHINE HAVING AN ABSENT RECTIFIER BLADE

TECHNICAL FIELD

The invention relates to a bypass turbine engine comprising a fan followed by a rectifier comprising fixed blades downstream of this fan with respect to the direction of circulation of the flow, wherein each fixed blade has an inner radial end engaged in a ferrule of an inner structure of a turbine engine.

PRIOR ART

A bypass turbine engine 1 such as the one of FIG. 1, comprises an intake sleeve 2 that takes in air aspirated by a fan 3, before division into a central primary flow and a secondary flow surrounding the primary flow.

The primary flow then passes through a low-pressure compressor 4 while the secondary flow is expelled towards the rear in order to generate a thrust. The primary flow then passes through a high-pressure compressor 6, before reaching a combustion chamber 7 to be expanded in a high-pressure turbine 8 then in a low-pressure turbine 9, before being expelled.

Each turbine and each compressor comprise blades carried by a rotor 11 rotating about a longitudinal axis AX and carried by an inner structure of revolution 12 that surrounds it. This inner structure 12 is itself surrounded by an outer structure of revolution 14 by being maintained to the latter by radial arms 13.

The primary flow circulates in an annular space delimited interiorly by the rotor 11 and exteriorly by the inner structure 12, and the secondary flow circulates in another annular space delimited interiorly by the inner structure and exteriorly by the outer structure 14.

The secondary flow having passed through the fan 3 is rectified by a series of fixed blades 16, called OGV for Outlet Guide Vane, which are located downstream of the fan and upstream of the radial arms 13 carrying the inner structure, which can be seen more clearly in FIG. 2.

As shown in FIG. 3, each fixed blade 16 comprises a radially external end 17 provided with a platform 18 through which it is bolted to the structure, and an opposite radially internal end 19 that is engaged in a corresponding opening 21 of a ferrule 22 of the inner structure 12. Additionally, a seal 23 is inserted between the end 19 and the opening 21 to which this seal is rigidly attached via snap-fitting.

This seal 23 limits the risk of deterioration of the end 19 surrounded by the opening 21 under the effect of friction resulting from vibrations and other mechanical stresses that intervene in service.

It can occur that a projectile such as a volatile aspirated by the engine, after having passed through the fan, causes the rupture of a rectifier blade, which leads for example to the situation of FIG. 4 wherein the rectifier blade 16 is absent.

Such an anomaly detected during the maintenance carried out after the flight involves installing a replacement blade, so that the aircraft can be authorised to take off again. Indeed, as shown in FIG. 4, the absent rectifier blade leaves a free opening 24 through the ferrule, through which sand or other can enter into the inner structure 12, and degrade the equipment that it contains.

In the example of FIG. 4, the inner structure 12 incorporates, immediately downstream of the free opening 24, a system for controlling 26 the opening of discharge valves 27 and the actuating cylinder 28 thereof, able to be taken out of service by the entry of foreign bodies into the structure 12 such as sand.

The purpose of the invention is to provide a solution that makes it possible to repair a turbine engine having a damaged rectifier blade, including when a replacement blade is not available.

DISCLOSURE OF THE INVENTION

To this effect, the invention has for object a shutter intended to fill in a free opening left empty in the absence of a fixed blade removed from a ferrule, this ferrule being configured to receive an end of this fixed blade, this shutter comprising means of fastening in the opening in order to close this opening in a sealed manner.

With this solution, it is not necessary to replace the damaged or missing blade, it is sufficient to remove it and to set the shutter in place, which ensures that impurities do not risk entering the inner structure of the engine and that the flow duct remains delimited in the absence of a blade. As such an engine is designed and sized to be able to operate with a missing rectifier blade, it can again be put into service for several flights, in such a way that the aircraft can be authorised to take off again.

The invention also relates to a shutter thus defined, wherein the means of fastening are of the type by snap-fitting.

The invention also relates to a shutter thus defined, comprising a cover having an outer face intended to cover the opening and an opposite inner face provided with an edge ensuring the snap-fitting thereof in the free opening.

The invention also relates to a shutter thus defined, obtained via additive manufacturing.

The invention also relates to a fixed rectifier of a turbine engine, comprising a ferrule provided with openings for receiving a blade end, the openings for receiving blades being regularly distributed over the circumference of the ferrule, with a blade being mounted in each opening for receiving a blade end except for one opening which is closed by a shutter thus defined.

The invention also relates to a rectifier thus defined, wherein the shutter is arranged in such a way as to be flush with the outer face of two adjacent seals, each seal being arranged around an end of a blade received in an opening for receiving a blade end.

The invention also relates to a rectifier thus defined, wherein the shutter is located at a distance from each adjacent seal between 0.4 and 1 mm.

The invention also relates to a turbine engine provided with a rectifier thus defined.

The invention also relates to a method for repairing a ferrule of a turbine engine, the ferrule having a damaged or absent fixed rectifier blade, this damaged or absent fixed rectifier blade leaving free an opening in the ferrule intended to receive an end of this fixed blade, with this method comprising a step of closing the free opening with a shutter thus defined.

DETAILED DESCRIPTION OF PARTICULAR EMBODIMENTS

Figure 1:
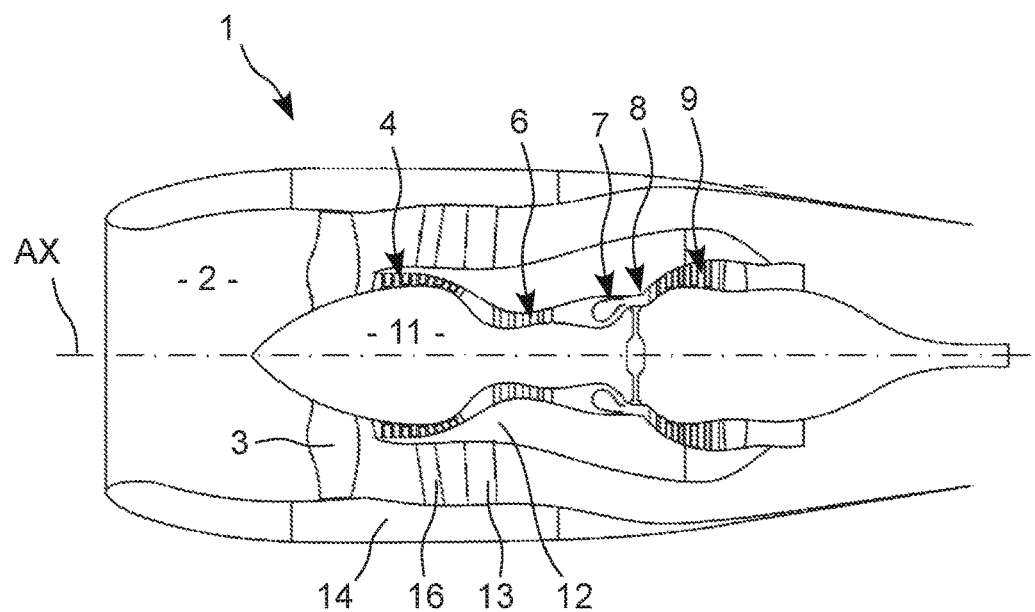
FIG. 1 already described is a longitudinal cross-section view of a known turbine engine.
Figure 2:
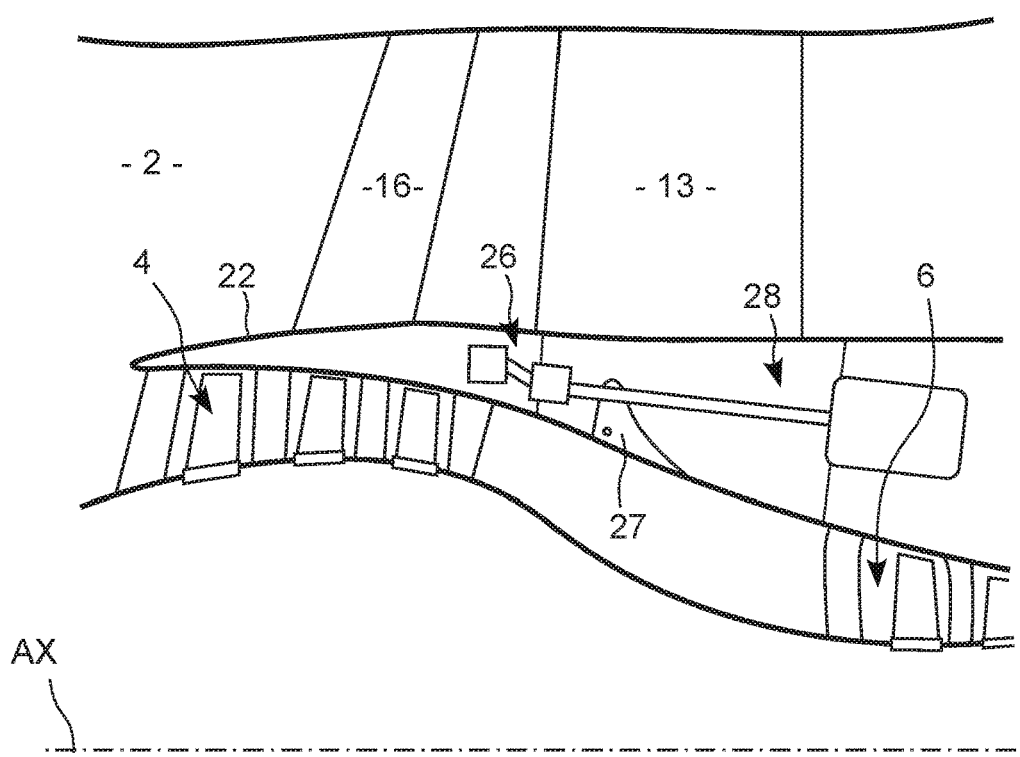
FIG. 2 already described is a longitudinal cross-section view of an upstream portion of a known turbine engine.
Figure 3:
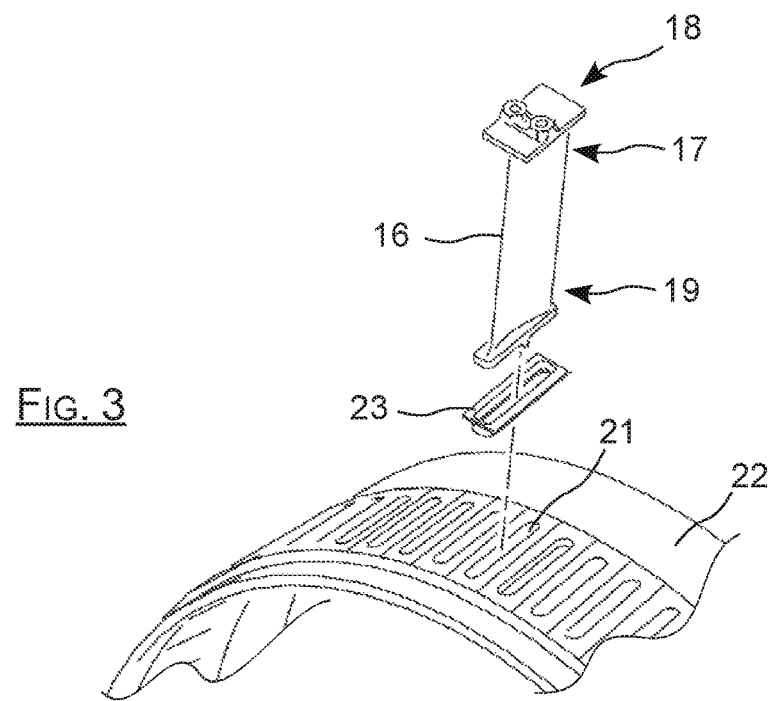
FIG. 3 already described is a perspective view showing the mounting of a fixed rectifier blade with a ferrule in a known turbine engine.
Figure 4:
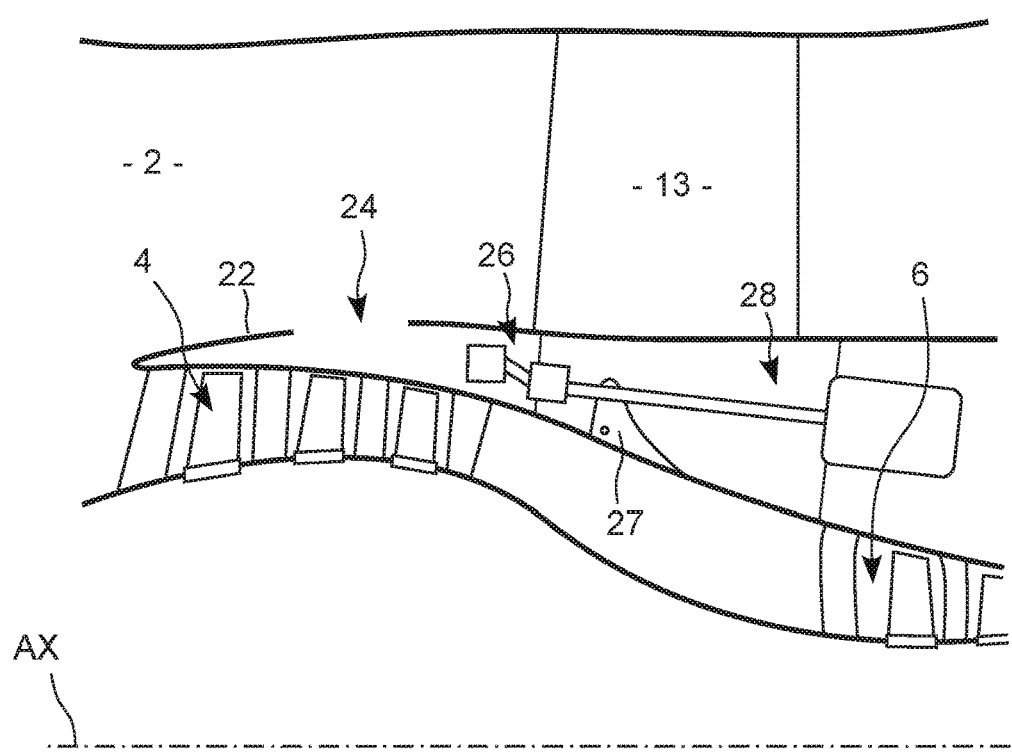
FIG. 4 already described is a longitudinal cross-section view of an upstream portion of a known turbine engine of which a fixed rectifier blade is absent.
Figure 5:
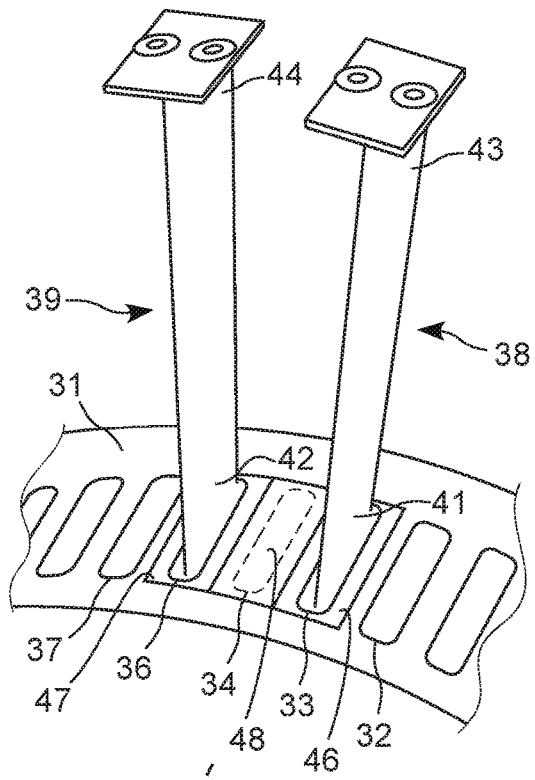
FIG. 5 is a perspective view of a ferrule provided with a shutter that closes an opening corresponding to an absent rectifier blade and located between two openings closed by two rectifier blades in accordance with the invention.

In FIG. 5, an inner ferrule 31 of a turbine engine rectifier intended to be located immediately downstream of a fan of this turbine engine, has an annular shape and comprises openings 32, 33, 34, 36, 37 passing through it. The ferrule 31 is part of an inner structure called inter-duct casing of the turbine engine interposed between the primary duct and the secondary duct.

These openings are regularly distributed about the longitudinal axis AX of the engine and each has an oblong shape oriented parallel to this axis AX. Each opening is intended to receive a radially internal end of a fixed rectifier blade. Two of these fixed blades 38, 39 are shown in FIG. 5 having their respective radially internal ends 41, 42 each engaged in an opening 33, 36.

Each one of these blades 38, 39 has its radially external end, marked as 43, 44 provided with a platform for fastening to a peripheral casing not shown of the rectifier that they equip.

Figure 6:
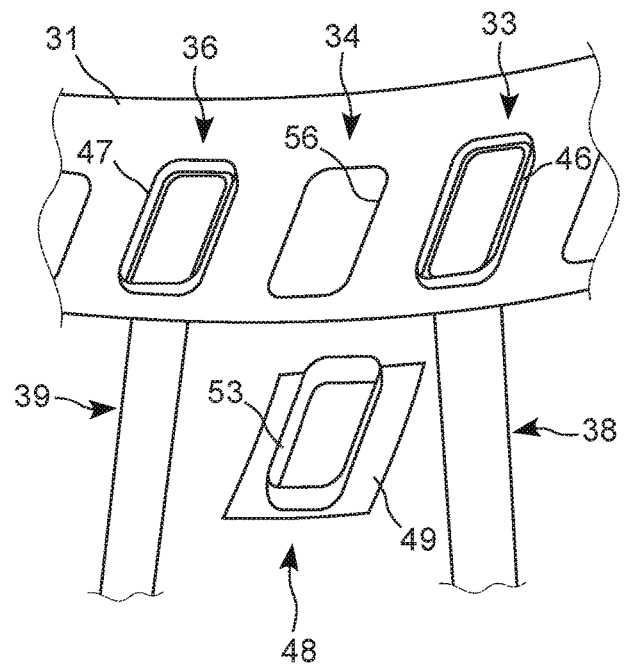
FIG. 6 is a perspective view of a ferrule comprising a free opening corresponding to an absent blade and located between two openings closed by two fixed rectifier blades with a shutter intended to close this free opening.

As can be seen in FIGS. 5 and 6, a seal 46 is inserted between the radially internal end of the blade 38 and the opening 33, this seal being snap-fit into the opening 33 and comprising a central opening through which the end 41 of the fixed blade 38 passes through. In the same way, another seal 47 of the same type is engaged in the opening 36 for receiving the end 42 of the blade 39.

The opening 34 is free, i.e. it is not passed through by a fixed blade. According to the invention a shutter 48 is provided to close this free opening 34 so as to prevent the entry of impurities such as sand or other particles present in the flow of air aspirated by the engine, and able to pass through the ferrule 31 to the components mounted in the inter-duct casing that this ferrule delimits locally.

The shutter 48 is installed when a fixed rectifier blade has been damaged or destroyed and therefore has to be removed for replacement. In the case where a replacement blade is not available during the maintenance operation on the ground, it is sufficient to install the shutter 48 in order to close the opening of the missing blade in such a way as to allow the aircraft to fly again.

The shutter 48 is a part of which the dimensions and the shapes are similar to those of the seals 46 or 47, it has the same fastening system as these seals 46 and 47, for example via snap-fitting, and is advantageously manufactured from the same material.

This shutter 48 is thus simple to design and it can be manufactured from resin by moulding, or by 3D printing. The installation thereof which does not involve any particular tool mainly requires removing a few fan blades in order to access the opening to be equipped, such an intervention is thus able to be carried out directly under the wing, i.e. without removing the engine.

Figure 7:
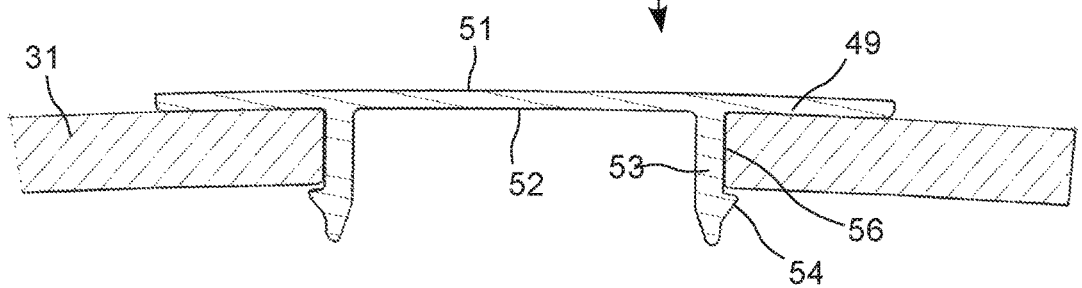
FIG. 7 is a longitudinal cross-section view of a portion of a ferrule provided with a shutter according to the invention.

As can be seen in FIG. 7, the shutter 48 mainly comprises a cover 49 with a generally rectangular shape and with dimensions greater than those of the opening 34 to be closed. This cover 49 comprises an outer face 51 that can be flat or curved according to the outline of the ferrule 31, and an inner face 52 from which extends an edge 53. This cover 49 with a rectangular contour has a length that is substantially greater than that of the opening 34, and a width that substantially corresponds to the distance that separates two consecutive openings of the ferrule 31, such as for example the openings 36 and 37.

This edge 53 extends to engage with the inner face of the opening 34. It has in the example of the figures a closed contour that has a shape and outer dimensions corresponding to those of the inner edge of the opening 34.

As can be seen in FIG. 6, this edge 53 is thus located recessed in relation to the outer contour of the cover 49, when seen from the front with respect to the inner face 52. This edge exceeds the inner face 52 by extending perpendicularly to the latter, as shown in FIG. 7.

More particularly, this edge 53 has in section, i.e. according to a section plane perpendicular to the cover 49, the shape of a straight wall comprising on its free end a lug 54 that exceeds from the outer face thereof, in order to form a protrusion engaging with the inner face 56 delimiting the opening 34.

This lug 54 has the shape of a spout, that exceeds outwards of the edge 53 in order to ensure the blocking of the shutter 48 in the opening 34 par snap-fitting. For the purposes of information, this lug exceeds the outer face of the edge 53 by a value between 6 and 10 tenths of a millimetre, to engage with the inner face 56 of the opening 34.

Once the opening 34 has been made accessible, the mounting of the shutter according to the invention thus consists mainly in placing it facing this opening and in exerting a pressure on its cover to snap-fit it into this opening.

Generally, the shutter 48 is arranged in such a way as to be flush with the two adjacent seals 46 and 47, i.e. its outer face 51 is at the same distance from the axis AX as the outer faces of the seals 46 and 47. Moreover, the shutter 48 is located at a distance from each adjacent seal that is between 0.4 and 1 millimetre, which makes it possible to have a mounting clearance that is sufficient to facilitate the nesting of the shutter, without generating any significant aerodynamic loss.

Figure 8:
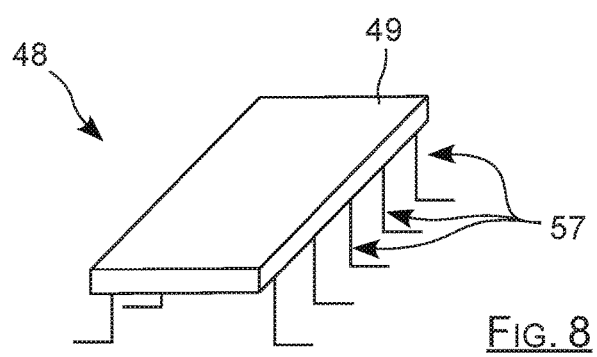
FIG. 8 is a perspective view of an alternative of a shutter according to the invention.

In the example of FIGS. 1 to 7, the means of fastening the shutter are formed by its edge 53, but other solutions can be considered, such as for example the one shown in FIG. 8 comprising a cover 49 provided at its inner face with foldable tabs 57, for example made of metal. Each tab 57 extends perpendicularly protruding from the inner face, and has an end that can be folded outwards in order to extend beyond the perimeter of the cover 49. These tabs 57 are evenly distributed along the perimeter of the cover 49.

The installation of the shutter then consists in engaging it in the opening 34 that has to be closed, then in accessing the inner face of the ferrule in order to fold the ends of the tabs 57 outwards so that they block the shutter 48 on the opening thanks to the tabs 57 engaging on the inner face 56 of this opening.

The invention claimed is:

1. Shutter (48) intended to fill in a free opening (34), left empty in the absence of a fixed blade (38, 39) removed from a ferrule (31), this ferrule (31) being configured to receive an end of this fixed blade (38, 39), this shutter (48) comprising means of fastening (53) in the opening (34) in order to close this opening (34) in a sealed manner.

2. Shutter (48) according to claim 1, wherein the means of fastening (53) are of the type by snap-fitting.

3. Shutter (48) according to claim 2, comprising a cover (49) having an outer face intended to cover the opening and an opposite inner face provided with an edge (53) ensuring the snap-fitting thereof in the opening (34).

4. Shutter according to claim 1, obtained via additive manufacturing.

5. Fixed rectifier of a turbine engine comprising a ferrule (31) provided with openings (33, 36) for receiving the end of a blade (38, 39), the openings (33, 36) for receiving blades being regularly distributed over the circumference of the ferrule (31), a blade being mounted in each opening (33, 36) for receiving an end of a blade except for one opening (34) which is closed by a shutter (48) according to claim 1.

6. Rectifier according to claim 5, wherein the shutter (48) is arranged in such a way as to be flush with the outer face of two adjacent seals (46, 47), each seal (46, 47) being arranged around an end of a blade (38, 39) received in an opening (33, 36) for receiving an end of a blade (38, 39).

7. Rectifier according to claim 6, wherein the shutter (48) is located at a distance from each adjacent seal (46, 47) between 0.4 and 1 mm.

8. Turbine engine provided with a rectifier according to claim 5.

9. Method for repairing a ferrule (3) of a turbine engine, the ferrule (31) having a damaged or absent fixed rectifier blade (38, 39), this damaged or absent fixed blade (38, 39) leaving free an opening (34) in the ferrule (31), with this method comprising a step of closing the opening (34) with a shutter according to claim 1.

* * * * *